United States Patent
Jeon et al.

(10) Patent No.: US 7,979,560 B2
(45) Date of Patent: Jul. 12, 2011

(54) METHOD OF PROVIDING PUSH SERVICE TO MOBILE TERMINAL IN A MOBILE COMMUNICATION SYSTEM FOR HIGH-SPEED DATA TRANSMISSION AND PUSH SERVER APPARATUS USING THE SAME

(75) Inventors: Young-Ki Jeon, Gyeonggi-do (KR); Ju-Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1932 days.

(21) Appl. No.: 11/044,018

(22) Filed: Jan. 28, 2005

(65) Prior Publication Data

US 2005/0172026 A1 Aug. 4, 2005

(30) Foreign Application Priority Data

Jan. 29, 2004 (KR) ........................ 10-2004-0005761

(51) Int. Cl.
*G06F 15/16* (2006.01)
*H04W 4/00* (2009.01)
*H04W 24/00* (2009.01)

(52) U.S. Cl. ...................... 709/228; 455/433; 455/456.1
(58) Field of Classification Search .................. 709/206, 709/227–228; 455/433, 456.1–456.6
See application file for complete search history.

(56) References Cited

U.S. PATENT DOCUMENTS

| | | | | |
|---|---|---|---|---|
| 5,862,481 A | * | 1/1999 | Kulkarni et al. | 455/432.2 |
| 6,078,575 A | * | 6/2000 | Dommety et al. | 370/338 |
| 6,643,511 B1 | * | 11/2003 | Rune et al. | 455/433 |
| 6,665,711 B1 | * | 12/2003 | Boyle et al. | 709/219 |
| 6,735,431 B1 | * | 5/2004 | Tsunami et al. | 455/414.2 |
| 6,742,127 B2 | * | 5/2004 | Fox et al. | 726/10 |
| 6,885,861 B2 | * | 4/2005 | Koskelainen | 455/414.2 |
| 2001/0041556 A1 | * | 11/2001 | Laursen et al. | 455/406 |
| 2002/0142763 A1 | | 10/2002 | Kolsky | |

(Continued)

FOREIGN PATENT DOCUMENTS

KR 1020030037448 5/2003

(Continued)

OTHER PUBLICATIONS

Aalto et al., Bluetooth and WAP Push Based Location-Aware Mobile Advertising System, Jun. 2004.*
Mouly et al., The GSM System for Mobile Communications, 1992.*
Wall, Service Development for WAP Push Delivery to Mobile Devices, 2002 http://epubl.luth.se/1402-1617/2002/107/LTU-EX-02107-SE.pdf.*

*Primary Examiner* — Joseph E Avellino
*Assistant Examiner* — James E Conaway
(74) *Attorney, Agent, or Firm* — Roylance, Abrams, Berdo & Goodman L.L.P.

(57) ABSTRACT

A method of providing a push service to an AT and a push server apparatus using the same to facilitate a data receiving service comprising reception of paging messages at the AT in a mobile communication system for high-speed data transmission are provided. The mobile communication system comprises at least one DLR for allocating a UATI to the AT when a communication is connected to the AT, a home DLR for storing the ID of the AT with respect to the identification information of the DLR, a PDSN for establishing a PPP session with the AT, a DNS, and a push server for buffering push data for the AT received from a CN and requesting paging of the AT for push data transmission to the AT from which the PPP session has been terminated.

21 Claims, 5 Drawing Sheets

U.S. PATENT DOCUMENTS

| | | | |
|---|---|---|---|
| 2004/0242238 A1* | 12/2004 | Wang et al. | 455/456.1 |
| 2004/0259553 A1* | 12/2004 | Delaney et al. | 455/445 |
| 2005/0020234 A1* | 1/2005 | Iivari et al. | 455/403 |
| 2005/0192035 A1* | 9/2005 | Jiang | 455/461 |

FOREIGN PATENT DOCUMENTS

| | | |
|---|---|---|
| KR | 1020030090824 | 12/2003 |
| KR | 1020040044216 | 5/2004 |
| KR | 1020040066326 | 7/2004 |

* cited by examiner ptimisingMETHOD OF PROVIDING PUSH SERVICE TO MOBILE TERMINAL IN A MOBILE COMMUNICATION SYSTEM FOR HIGH-SPEED DATA TRANSMISSION AND PUSH SERVER APPARATUS USING THE SAME

PRIORITY

This application claims the benefit under 35 U.S.C. §119(a) of an application entitled "Method of Providing Push Service to Mobile Terminal in a Mobile Communication System for High-Speed Data Transmission and Push Server Apparatus Using the Same" filed in the Korean Intellectual Property Office on Jan. 29, 2004 and assigned Serial No. 2004-5761, the entire disclosure of which is hereby incorporated by reference.

BACKGROUND OF THE INVENTION

1. Field of the Invention

The present invention relates generally to a data communication method and apparatus in a mobile communication system. In particular, the present invention relates to a method for providing a push service to a mobile terminal and a push server apparatus using the same in a mobile communication system for high-speed data transmission in order to facilitate a data receiving service such as transmission of paging messages for the mobile terminal.

2. Description of the Related Art

Mobile communication systems typically use three principal multiple access schemes. These are Frequency Division Multiple Access (FDMA), Time Division Multiple Access (TDMA), and Code Division Multiple Access (CDMA). In FDMA, the bandwidth of the available spectrum is divided into separate channels, each channel being allocated to a subscriber. In TDMA, the same spectrum channel frequency is shared among a plurality of subscribers by dividing it over time. In CDMA, a plurality of subscribers occupy the same frequency at the same time and they are separated from each other by different codes allocated to them. Along with the rapid development of communication technology, these mobile communication systems now provide mobile terminals with high-speed data service enabling transmission of a larger volume of digital data, such as moving pictures as well as e-mails and still images, in addition to the typical voice call service.

Mobile communication systems supporting the high-speed data service include CDMA2000 1× now in service, Evolution Data Only (1×EV-DO) enabling high-speed data transmission, and International Mobile Telecommunication 2000 (IMT-2000), which is a future-generation mobile communication system under study for transmission/reception of voice and packet data irrespective of place and time. The CDMA 2000 1× system provides data service at a forward data rate of 144 kbps over the IS-95C network, which has evolved from the IS-95A/ISD-95B network, that is faster than in IS-95A/ISD-95B networks that offer 14.4 kbps/56 kbps. The 1×EV-DO standard is one of the standards proposed, by service providers such as Qualcomm, for transmission of a larger volume of digital data. The 1×EV-DO standard has evolved from CDMA2000 1× to be able to provide a forward data rate of about 2.4 Mbps. The 1×EV-DO network provides data service with a Point-to-Point Protocol (PPP) session established for a mobile terminal, as specified in the standard.

Depending on the connection state of the PPP session, the mobile terminal is placed in an active state, a dormant state, and an idle/null state in the 1×EV-DO network. In the active state, the mobile terminal transmits/receives data to/from a correspondent node (CN) such as an external host connected to an Internet Protocol (IP) network like the Internet via a packet data service node (PDSN) as defined in the CDMA2000 1× network.

In the dormant state, although the PPP session is still connected, a radio bearer for wireless data transmission is released due to the absence of data transmission/reception for a predetermined time period. Yet, the mobile terminal can resume data transmission/reception with the CN. However, in the idle/null state, the PPP session has not been established or is terminated between the mobile terminal and the packet data service node (PDSN). Without a PPP reconnection, the mobile terminal cannot transmit/receive data to/from the CN.

In the idle/null state, therefore, a paging message or a packet cannot be delivered from the CN to the mobile terminal by a data receiving service over the conventional 1×EV-DO network. Especially, considering that an additional service, such as a video call service, is expected to be provided to the mobile terminal, the data receiving service is essential.

To provide the data receiving service with the conventional 1×EV-DO network configuration, IP addresses must be allocated to all mobile terminals and they must be connected to the network. However, this method is not viable in the present Internet Protocol version 4 (IPv4) address system. Accordingly, there exists a need for notifying a mobile terminal in an idle/null state of incoming data, such as a paging message.

SUMMARY OF THE INVENTION

An object of the present invention is to substantially solve at least the above problems and/or disadvantages and to provide at least the advantages described below. Accordingly, an object of the present invention is to provide a method of providing a push service to a mobile terminal to notify the mobile terminal of data incoming irrespective of PPP session setup in a mobile communication system for high-speed data transmission.

Another object of the present invention is to provide a push server apparatus for providing a push service to a mobile terminal irrespective of PPP session setup.

A further object of the present invention is to provide a method and system for locating a mobile terminal to provide a push service.

The above objects are achieved by providing a method of providing a push service to an access terminal (AT) and a push server apparatus using the same to facilitate a data receiving service including reception of paging messages at the AT in a mobile communication system for high-speed data transmission.

According to one aspect of the present invention, in a method of receiving data to be transmitted to a mobile station by using a push service, a register is identified based on a terminal ID of the mobile station, if an IP address is not assigned to the mobile station, a message for requesting to page the mobile station is transmitted to the register, an IP address of the mobile station is received, and the data is transmitted to the mobile terminal by using the IP address.

According to another aspect of the present invention, in a method of locating a mobile terminal to provide a push service from a CN connected to an IP network to the mobile terminal of a subscriber in a mobile communication for high-speed data transmission, a predetermined terminal ID of a mobile terminal to which a temporary ID has been allocated when the mobile terminal is connected to a network is registered in a home DLR, it is determined whether an IP address exists for the mobile terminal, upon request for transmission of push data to the mobile terminal, a terminal location request message comprising the terminal ID of the mobile terminal is transmitted to the home DLR, if the terminal ID does not exist for the mobile terminal, and a terminal location response message comprising an IP address of a DLR, which has allocated the temporary ID to the mobile terminal is received from the home DLR.

According to a further aspect of the present invention, in a system for providing a push service from a CN connected to an IP network to a mobile terminal of a subscriber in a mobile communication system for high-speed data transmission, a DLR allocates a predetermined temporary ID to a mobile terminal when the mobile terminal is connected to a network, and stores a predetermined terminal ID of the mobile terminal with respect to the temporary ID. A home DLR stores the terminal ID of the mobile terminal to which the temporary ID has been allocated with respect to an IP address of the DLR. A push server, upon request for transmission of push data to the mobile terminal, requests the home DLR for the IP address of the DLR, which has allocated the temporary ID to the mobile terminal, and transmits a paging request message for the mobile terminal to the DLR.

According to still another aspect of the present invention, in a server apparatus for transmitting push data received from a CN to a mobile terminal of a mobile subscriber in a mobile communication system having at least one DLR for allocating a predetermined temporary ID to the mobile terminal when a communication connection is made with the mobile terminal, a home DLR for storing a predetermined terminal ID of the mobile terminal to which the temporary ID has been allocated with respect to predetermined identification information of the DLR, a PDSN for establishing a PPP session with the mobile terminal, and a DNS, a plurality of communication interfaces interface the server apparatus with the DLR, the home DLR, the PDSN, the DNS, and CN. A subscriber information table stores the terminal ID of the mobile terminal with respect to a predetermined subscriber ID allocated to a subscriber received together with the push data. A memory buffers the push data. A controller temporarily stores the push data received from the CN, checks the terminal ID corresponding to the subscriber ID, and transmits the push data to an IP address corresponding to the terminal ID.

BRIEF DESCRIPTION OF THE DRAWINGS

The above and other objects, features and advantages of the present invention will become more apparent from the following detailed description when taken in conjunction with the accompanying drawings in which.

Throughout the drawings like reference numbers will be understood to refer to like elements, features, and structures.

DETAILED DESCRIPTION OF EXEMPLARY EMBODIMENTS

An exemplary embodiment of the present invention will be described below with reference to the accompanying drawings. In the following, descriptions of well-known functions or constructions are omitted for the sake of conciseness.

Figure 1:
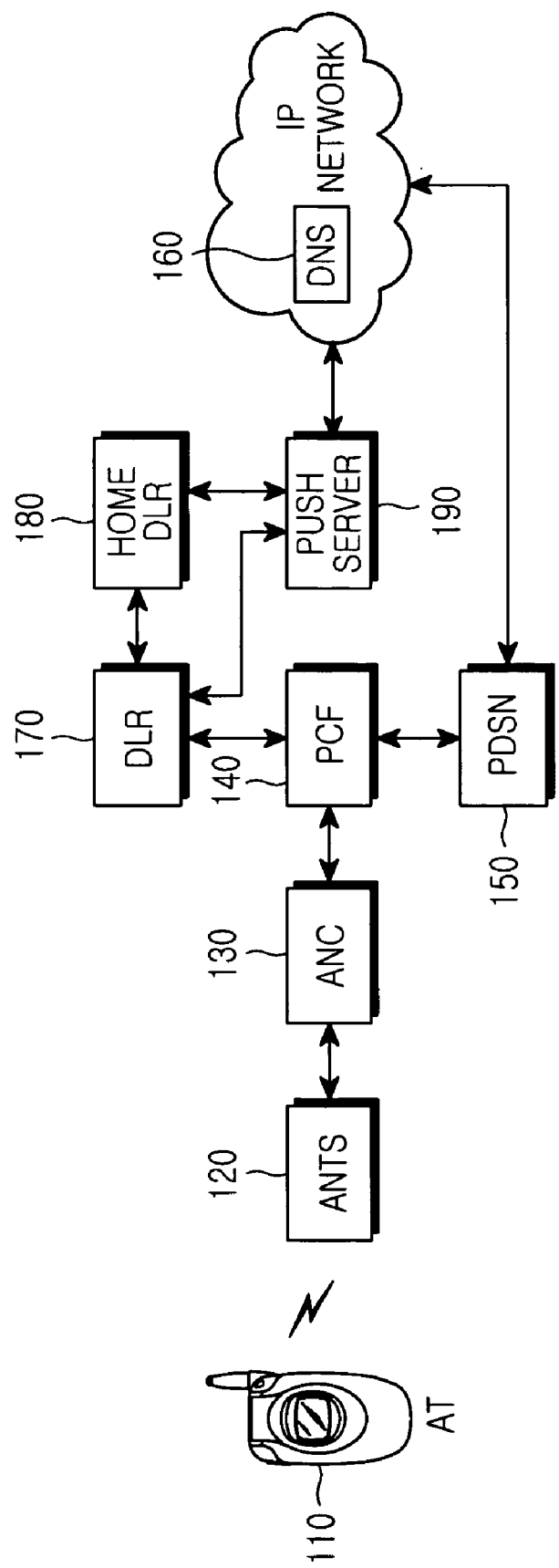
FIG. 1 is a block diagram of a conventional mobile communication system for a high-speed data transmission to which an embodiment of the present invention is applied.

FIG. 1 is a block diagram of a mobile communication system for high-speed data transmission to which an embodiment of the present invention is applied. A 1×EV-DO network configured to notify an AT of data incoming from a CN is illustrated by way of example. While network entities are shown one by one, multiple network entities form the 1×EV-DO network in a real-world implementation.

Referring to FIG. 1, the mobile communication system includes an AT 110, an access network transceiver system (ANTS) 120 for exchanging data with the AT 110, and an access network controller (ANC) 130 between the ANTS 120 and a packet control function (PCF) 140, for controlling data transmission/reception of the ANTS 120.

The PCF 140 is connected between the ANC 130 and a PDSN 150 and controls packet flow. The PDSN 150 is PPP-connected to the AT 110 and serves as a gateway for allowing the AT 110 to connect to a public serving data network (PSDN), such as an IP network.

A domain name server (DNS) 160 is connected to the IP network and manages the IP addresses of network entities connected to the mobile communication system. The DNS 160, upon receipt of a DNS Query message asking for the IP address of the AT 110 from a later-described push server 190, determines whether the IP address is present and transmits a DNS Response message in correspondence with the presence or absence of the IP address to the push server 190.

The DNS Query message has a predetermined unique AT identifier (ID) given to the AT 110. The domain host name of the AT 110 is used as the AT ID so that the DNS 160 can identify the AT 110. If the e-mail ID of the subscriber is abc, his phone number is 1234567, and the domain name of a mobile communication service provider is ktf.com, the domain host name can be abc.ktf.com or 1234567.ktf.com, for example.

The DNS 160 stores the ID of the AT 110, such as the domain host name, and the ID address of the AT 110 so that they match. In the presence of the IP address for the AT 110, the DNS Response message includes the IP address. In the absence of the IP address, that is, without a PPP session established for the AT 110, the DNS Response message notifies the push server 190 of the absence of the IP address for the AT 110.

When the CN transmits data like a paging message (hereinafter, referred to as push data) destined for the AT 110 in the idle/null state, the push sever 190 transmits a message requesting the location of the AT 110 to a home data location register (DLR) 180 and receives from the home DLR 180 an AT location response message preferably including information about the IP address of a DLR having the location of the AT 110 registered therein, or information associated with the IP address (such as the ID of the DLR).

The home DLR 180 is a new network entity proposed to locate the AT 110 whose PPP session has been terminated according to an embodiment of the present invention.

Upon receipt of the DLR ID by the AT location response message, the push server 190 stores the DLR ID and the IP address of a DLR 170 corresponding to the DLR ID in a mapping table. For notational simplicity, it is assumed that the location of the AT 110 has been registered to the DLR 170 and thus the AT location response message delivers the IP address of the DLR 170.

The DLR 170 basically registers (allocates) and manages information about the location of the AT 110 and is provided with a communication interface (not shown) for connecting to the home DLR 180. According to an embodiment of the present invention, the location of the AT 110 is registered using a temporary ID allocated to the AT 110 at each registration, a unicast access terminal identifier (UATI). The UATI allocation will be described later in more detail with reference to FIG. 3.

The DLR 170 registers its own DLR ID (such as an IP address) and the ID of the AT 110 to which a UATI has been allocated in the home DLR 180, so that the push server 190 can obtain the IP address of the DLR 170 that manages the location information of the AT 110 through the home DLR 180.

The DLR 170 also stores the UATI and ID of the AT 110 in a mapping table. Upon receipt of a paging request message for the AT 110 from the push server 190 that has received the IP address of the DLR 170, the DLR 170 checks the UATI of the AT 110 and forwards the paging request message to the AT 110, for a PPP session for the AT 110.

The paging request message preferably includes the ID of the AT 110, and the DLR 170 is so configured as to include a known session controller/mobility manager (SC/MM: not shown) to forward the paging request message to the AT 110.

The home DLR 180 registers and stores the IP address of the DLR 170 and the IDs of all ATs including the AT 110 to which UATIs have been allocated by the DLR 170. Upon receipt of the AT location request message from the push server 190, the home DLR 180 tells the push server 190 the IP address of the DLR 170 that manages the UATI of the AT 110. The home DLR 180 is also provided with communication interfaces (not shown) for connecting to the DLR 170 and the push server 190.

The push server 190, when receiving push data destined for the AT 110 from a CN connected to the IP network, first buffers the push data in an internal memory. The push server 190 then transmits the DNS Query message to the DNS 160, asking whether an IP address exists for the AT 110, and receives from the DNS 160 the DNS Response message corresponding to the presence or absence of the IP address for the AT 110.

The push data is delivered to the push server 190, together with a subscriber ID. The subscriber ID can be any information that identifies the subscriber in the CN, such as the e-mail address of the subscriber or a known session initiation protocol (SIP) uniform resource identifier (URI).

The push server 190 manages the IDs of all subscribers such as their e-mail addresses, for example, and AT IDs corresponding to the subscriber IDs, such as domain host names, in a mapping table. The push server 190 detects the AT 110 to which the push data is directed to in the mapping table.

If the DNS Response message includes the IP address of the AT 110, the push server 190 transmits the push data to the IP address via the PDSN 150. If the IP address does not exist for the AT 110, the push server 190 detects the IP address of the DLR 170 that manages the UATI of the AT 110 through the home DLR 180 and transmits a paging request message for the AT 110 to the DLR 170.

Figure 2:
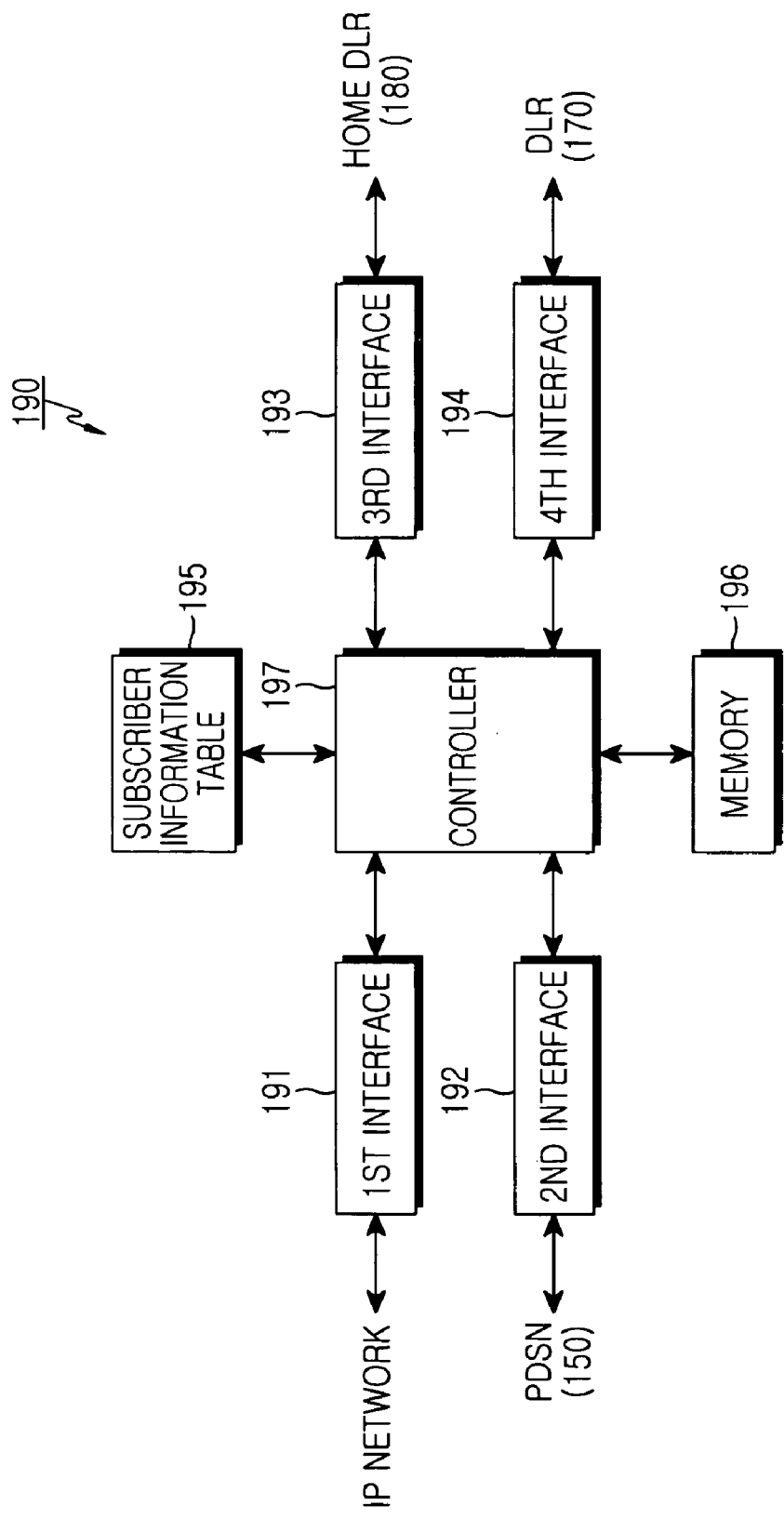
FIG. 2 is a block diagram of a push server illustrated in FIG. 1.

FIG. 2 is a block diagram of the push server 190 illustrated in FIG. 1.

Referring to FIG. 2, the first to fourth interfaces 191 to 194 are connected to a controller 197. They interface with a CN, in this case, the IP network, and the DNS 160, the PDSN 150, the home DLR 180, and the DLR 170, respectively.

The controller 197 is connected to the external IP network such as the Internet via the first interface 191, receives push data from the CN, and transmits/receives the DNS Query/Response message to/from the DNS 160. The controller 197 buffers the push data and, if an IP address has been allocated to the AT 110, connects to the IP network and transmits the push data to the PDSN 150 via the second interface 192.

The controller 197 is connected to the home DLR 180 via the third interface, transmits/receives the AT location request/response message, and obtains the IP address of the DLR 170 that manages the UATI of the AT 110 to be paged. Also, the controller 197 is connected to the DLR 170 via the fourth interface 194 and transmits the paging request message to the DLR 170.

While the first to fourth interfaces 191 to 194 are shown separately to be distinguishable from other network entities connected to the push server 190, they can be incorporated into a single interface when network entities are connected to the same communication network.

A subscriber information table 195 maps subscriber IDs to AT IDs. A memory 196 is used to buffer the push data destined for the AT 110.

Meanwhile, according to embodiments of the present invention, the paging request message directed from the push server 190 to the DLR 170 comprises a command for a PPP session setup for the AT 110, and the AT 110 performs a PPP session setup procedure with the PDSN 150 according to the command. The AT 110 is configured to have a predetermined demon (hereinafter, referred to as a push demon) for receiving the paging request message in the state where the PPP session is terminated and receiving the push data after setup of the PPP session.

For a better understanding of the embodiments of the present invention, location registration for the AT 110 through the DLR 170 and the home DLR 180 illustrated in FIG. 1 will be described below.

Figure 3:
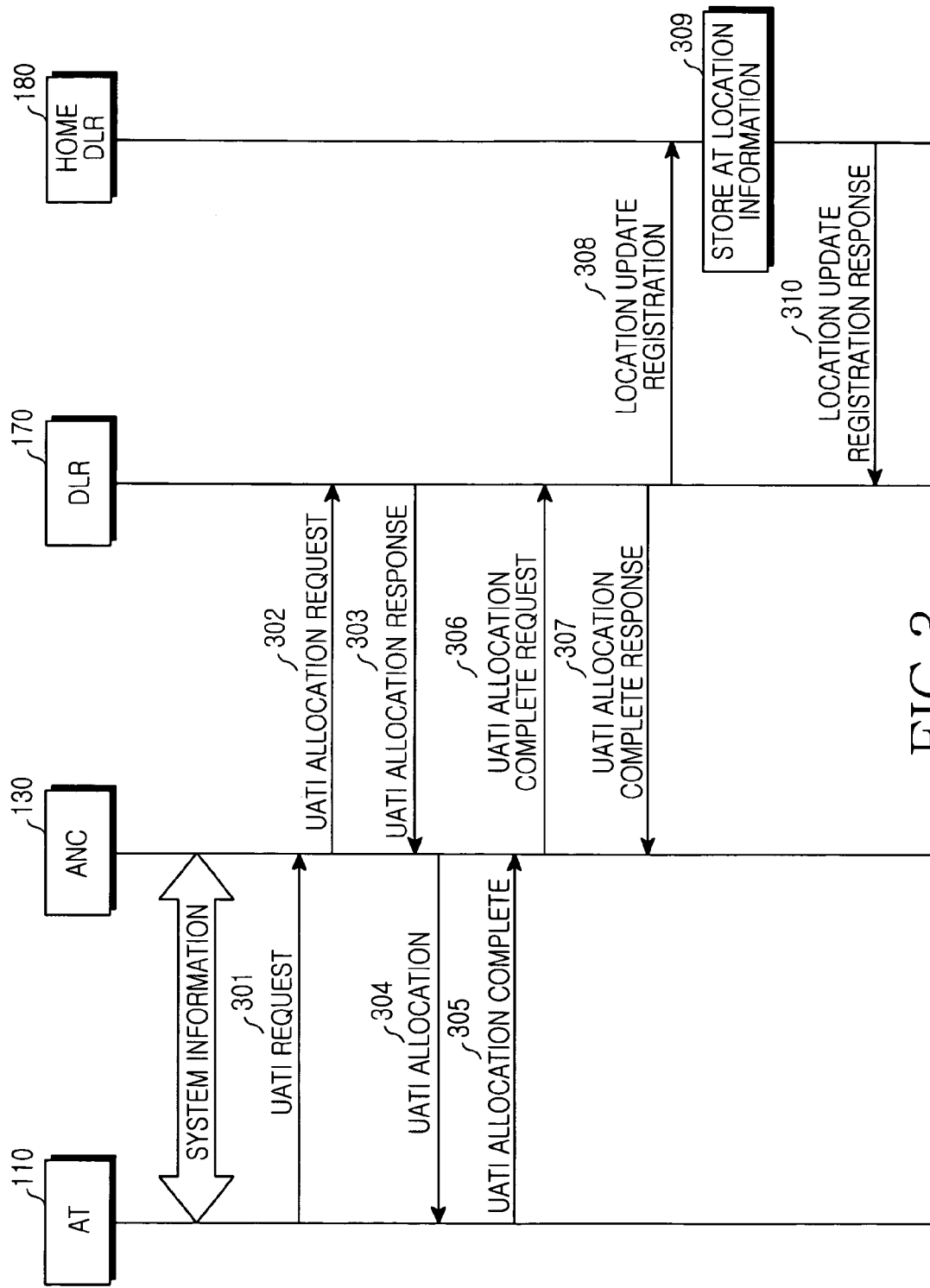
FIG. 3 is a diagram illustrating a message flow for registering the location of an access terminal (AT) according to an embodiment of the present invention.

FIG. 3 is a diagram illustrating a message flow for registering the location of the AT 110 according to an embodiment of the present invention.

Referring to FIG. 3, the ANC 130 periodically broadcasts subnet information (system information) of the mobile communication system. When the AT 110 is initially operated or there is a change in the system information, the AT 110 transmits to the ANC 130 a UATI request message including its identification information for location registration in step 301. In step 302, upon receipt of the UATI request message from the AT 110, the ANC 130 determines whether the AT 110 is initially connected to a subnet or has moved from a neighboring subnet and then transmits to the DLR 170 a UATI allocation request message comprising paging parameters associated with the AT 110 in step 302.

In step 303, the DLR 170 allocates a UATI to the AT 110 for the location registration of the AT 110 and transmits a UATI allocation response message comprising the UATI to the ANC 130. The ANC 130 notifies the AT 110 of the UATI by a UATI allocation message in step 304 and the AT 110 transmits to the ANC 130 a UATI allocation complete message indicating the reception of the UATI in step 305.

In step 306, the ANC 130 notifies the DLR 170 of the completed UATI allocation to the AT 110 by a UATI allocation complete request message and the DLR 170 stores the UATI and the ID of the AT 110 in a mapping table. The DLR 170 then transmits a UATI allocation complete response message to the ANC 130 in step 307.

In step 308, the DLR 170 transmits to the home DLR 180 a location update registration message including the ID of the AT 110 to which the UATI has been allocated and the ID of the DLR 170 (such as its IP address). The home DLR 180 registers and stores the ID of the AT 110 and the IP address of the DLR 170 as the location information of the AT 110 in step 309 and transmits to the DLR 170 a location update registration response message confirming that the location information of the AT 110 has been updated in step 310. Thus, the location registration of the AT 110 is completed.

In the above-described procedure, the push server 190 illustrated in FIG. 1 can detect the DLR 170 that manages the UATI of the AT 110 by connecting to the home DLR 180 and transmit a paging request message to the desired AT 110 through the DLR 170.

A method of providing a push service to an AT in the mobile communication system for high-speed data transmission according to an embodiment of the present invention will now be described below with reference to the message flows illustrated in FIGS. 4 and 5.

Figure 4:
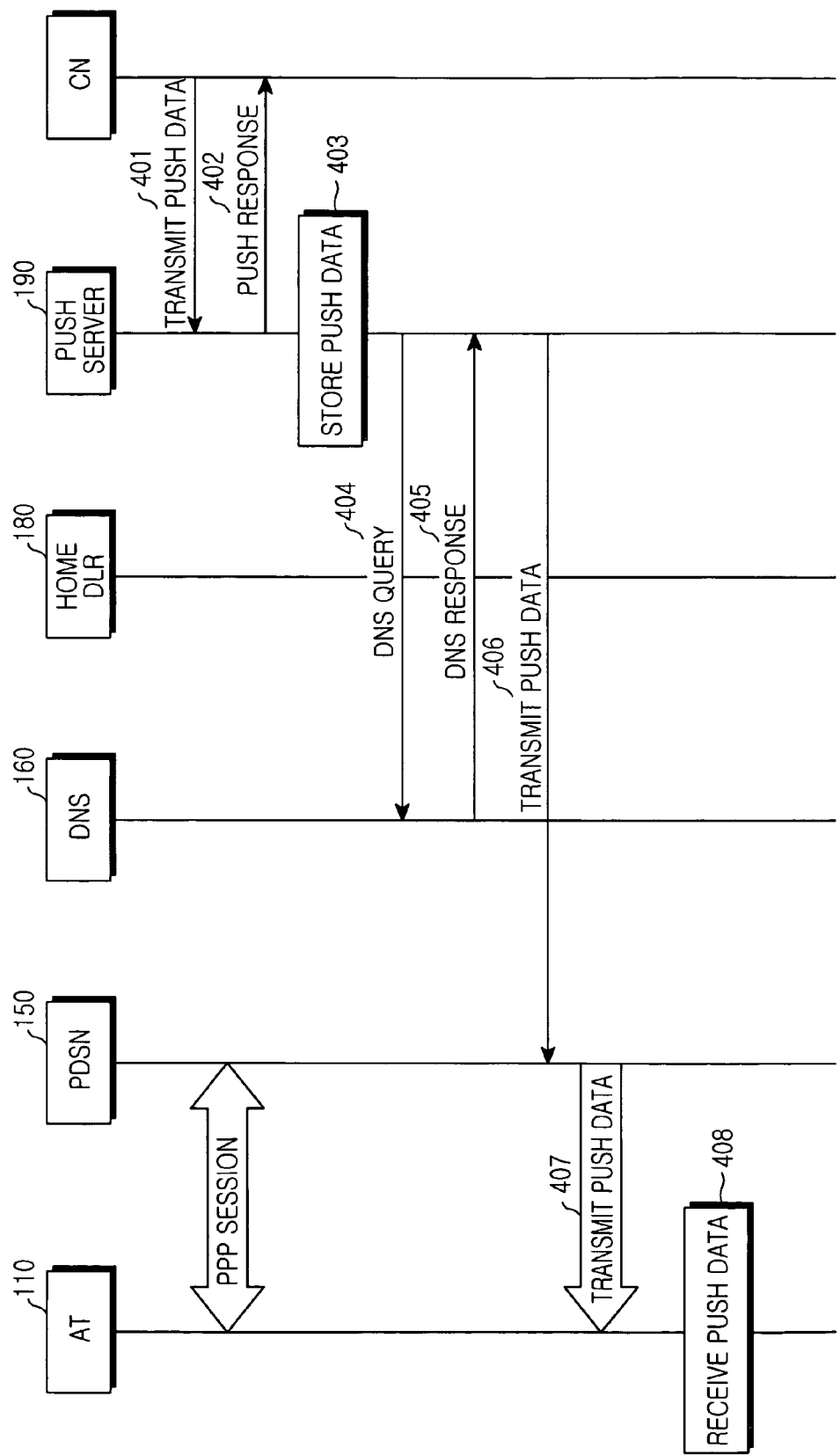
FIGS. 4 and 5 are diagrams illustrating message flows for providing a push service to the AT in the mobile communication system for high-speed data transmission according to embodiments of the present invention.

FIG. 4 illustrates a method according to an embodiment of the present invention for providing a push service to the AT 110 for which a PPP session has been established.

Referring to FIG. 4, a PPP session has already been established between the AT 110 and the PDSN 150. While not shown, the push demon of the AT 110 is implemented for a predetermined communication port and the AT 110 awaits reception of push data from the push server 190. Upon receipt of push data destined for the AT 110 from a CN in step 401, the push server 190 transmits a push response message confirming the reception of the push data to the CN in step 402 and buffers the received push data in the memory 196 in step 403.

In step 404, the push server 190 searches the subscriber information table 195 using a subscriber ID set in the push data, such as the e-mail address or SIP URI of a subscriber, reads an AT ID such as a domain host name corresponding to the subscriber ID, and transmits a DNS Query message including the AT ID to the DNS 160.

The DNS 160 detects the IP address of the AT 110 corresponding to the AT ID set in the DNS Query message and transmits a DNS Response message comprising the IP address to the push server 190 in step 405. If the IP address corresponding to the AT ID does not exist in step 405, this implies that a PPP session is not established for the AT 110. A push service for the AT 110 without the PPP session will be described later with reference to FIG. 5.

The push server 190 reads the push data from the memory 196 and transmits the push data to the PDSN 150 for transmission to the IP address of the AT 110 in step 406. In step 407, the PDSN 150 forwards the push data to the AT 110. The push demon of the AT 110 notifies the subscriber of the incoming push data through an LCD display (not shown) or by alarm sounds in step 408.

Figure 5:
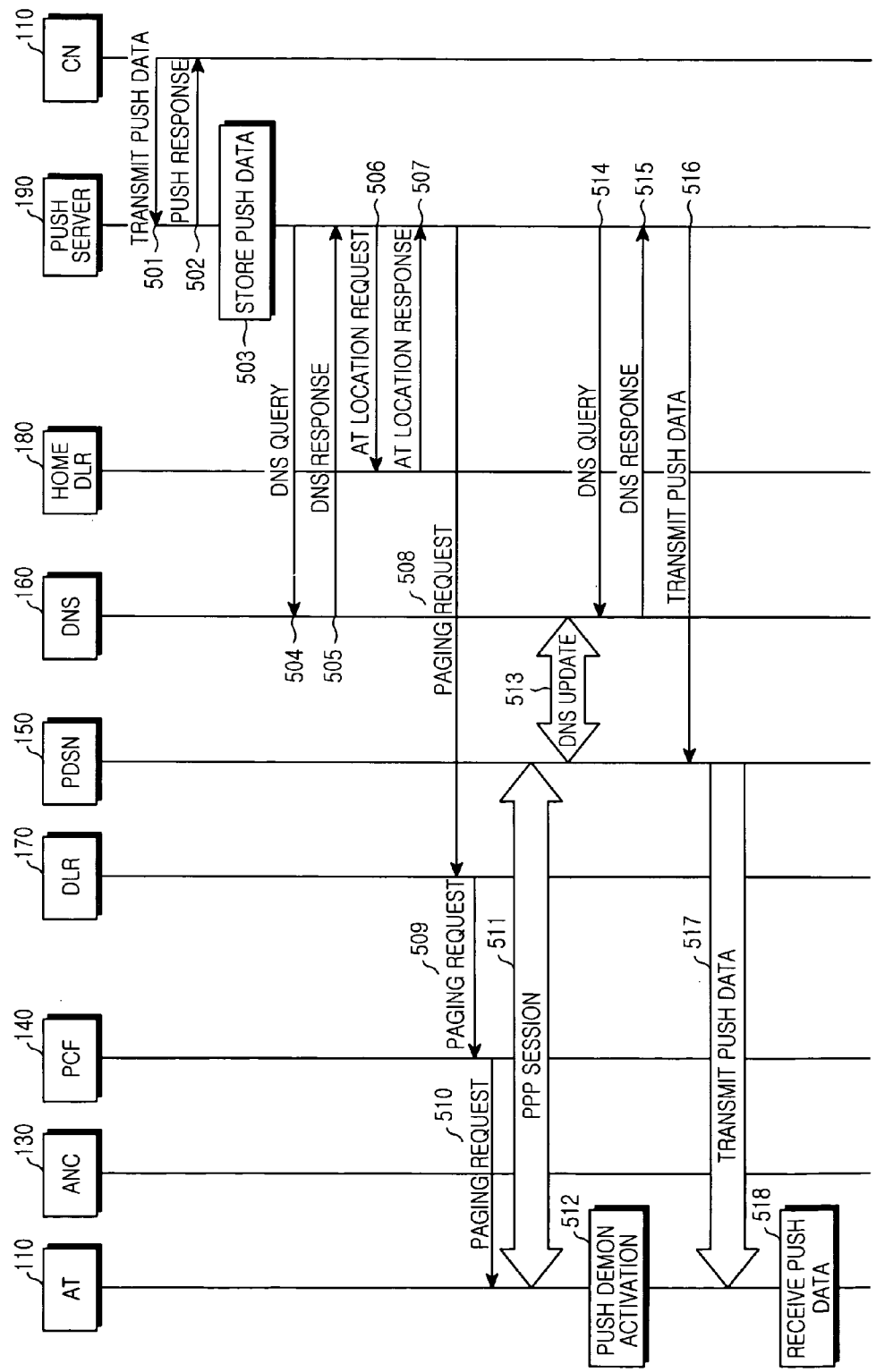

FIG. 5 illustrates a method of providing the push service to the AT 110 from which the PPP session has been terminated.

Referring to FIG. 5, steps 501 to 504 are performed in the same manner as steps 401 to 404 illustrated in FIG. 4 in that the push server 190 buffers push data received from the CN and requests from the DNS 160 the IP address of the AT 110. Therefore, a detailed description of steps 501 to 504 will not be provided herein.

In the case illustrated in FIG. 5, a PPP session is terminated between the AT 110 and the PDSN 150, or the PPP session has not been established yet after initial operation of the AT 110. Meanwhile, upon receipt of a DNS Query message from the push server 190, the DNS 160 determines whether an IP address exists for the AT 110 in correspondence with an AT ID set in the DNS Query message in step 505. Since the PPP session has not been established yet for the AT 110, the IP address does not exist. Therefore, the DNS 160 transmits to the push server 190 a DNS Response message indicating the absence of an IP address for the AT 110.

The push server 190 transmits an AT location request message including the ID of the AT 110 to the home DLR 180 in step 506, and, if the AT ID was registered, the home DLR 180 transmits to the push server 190 an AT location response message comprising the IP address of the DLR 170 to which the AT ID was registered in step 507. While not shown, if the AT ID was not registered in step 507, an error operation is performed.

In step 508, the push server 190 transmits a paging request message comprising the ID of the AT 110 to the DLR 170. The paging request message comprises a predetermined command for a PPP session setup for the AT 110. The paging request message is transmitted to the AT 110 via the DLR 170 and the PCF 140 in steps 509 and 510.

In step 511, the AT 110 establishes a PPP session with the PDSN 150 and the PDSN 150 allocates an IP address to the AT 110, for data reception. The AT 110 awaits reception of the push data through a predetermined communication port as the push demon is activated in step 512.

In step 513, the PDSN 150 performs a DNS update operation in which the IP address allocated to the AT 110 is notified to the DNS 160 through a home authentication, authorization, accounting (AAA) server or a home agent. Steps 514 to 518 are performed in the same manner as steps 404 to 408 illustrated in FIG. 4 in that the push server 190 transmits the push data to the AT 110 and the data receiving service is provided in the AT 110 and thus their detailed description is not provided here.

Transmission of the DNS Query message from the push server 190 to the DNS 160 as in step 514 occurs in every predetermined period after the push server 190 receives push data, or each time the DNS 160 notifies the push server 190 of a DNS update after the DNS update in step 513. Also, it can be contemplated that the push server 190 counts a predetermined time period using a timer after transmitting the paging request message in step 508 and transmits the DNS Query message upon expiration of the time period.

In the above embodiment of the present invention, the push data received from a CN is buffered for an AT with a PPP session terminated, and new network entities for requesting paging to the AT in the idle/null state, such as a push server, a home DLR, and a DLR, have been defined. Through the network entities, a data receiving service can be provided to the AT irrespective of PPP session setup.

As described above, embodiments of the present invention enable transmission of a paging message to a subscriber irrespective of PPP session setup for an AT of the subscriber. Also, IPv4-based bidirectional multimedia service can be provided because a data push is ensured for ATs in an IPv4-based mobile communication system using limited IP resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method comprising the steps of:
   receiving data from a correspondent node (CN) connected to an internet protocol (IP) network, the data to be transmitted to a mobile station by using a push service;
   storing, temporarily, the received data at a push server;
   identifying a data location register ("DLR") based on a terminal ID of the mobile station, if an IP address is not assigned to the mobile station;
   transmitting a message for requesting to page the mobile station to the DLR using an identifier of the DLR, the identifier being an IP address;

receiving an IP address of the mobile station, the IP address of the mobile station allocated in response to the message requesting to page the mobile station; and transmitting the data to the mobile terminal by using the IP address of the mobile station, the IP address corresponding to the terminal ID, wherein the DLR allocates a temporary ID to the mobile terminal when the mobile station is connected to a network, and transmits a message including the terminal ID of the mobile station and the identifier of the DLR to a home DLR ("home DLR") for registering location information of the mobile station, and wherein the push server, upon request for transmission of push data to the mobile terminal, requests the home DLR for the identifier of the DLR which has allocated the temporary ID to the mobile terminal;

wherein the receiving of the data further comprises of receiving the data together with a predetermined subscriber ID allocated to a subscriber of the mobile station, and detecting the terminal ID according to the subscriber ID.

2. The method of claim 1, further comprising the step of buffering the data by a predetermined server connected to the mobile communication system before the data is transmitted to the mobile station.

3. The method of claim 1, wherein the request message to page comprises a predetermined command for a point-to-point protocol (PPP) session setup allocating the IP address to the mobile station.

4. The method of claim 1, further comprising the step of activating a predetermined push daemon, after the PPP session setup, for push data reception and transitioning to an idle state to await reception of the push data by the mobile terminal.

5. The method of claim 1, further comprising the step of transmitting the paging request message to the mobile terminal by the DLR which manages a subnet connected to the mobile terminal.

6. The method of claim 1, further comprising the step of determining whether an IP address exists for the mobile terminal after the PPP session setup.

7. The method of claim 1, further comprising the step of establishing a point-to-point (PPP) session with a packet data service node (PDSN) by the mobile station, upon receipt of message for requesting to page.

8. The method of claim 7, wherein the step of establishing the PPP session comprises the step of establishing the PPP session according to the command by the mobile terminal.

9. The method of claim 1, wherein the step of identifying a register comprises the steps of:

the transmitting to a home DLR a terminal location request message including the terminal ID of the mobile station; and receiving from the home DLR a terminal location response message including the identifier of the DLR which has allocated the temporary ID to the mobile terminal.

10. The method of claim 9, wherein the home DLR stores the terminal ID of the mobile station.

11. A system for providing a push service from a correspondent node (CN) connected to an internet protocol (IP) network to a mobile terminal of a subscriber in a mobile communication system for high-speed data transmission, comprising:

a data location register ("DLR") for allocating a predetermined temporary identifier (ID) to a mobile terminal when the mobile terminal is connected to a network, storing a predetermined terminal ID of the mobile terminal with respect to the temporary ID and transmitting a message including the terminal ID of the mobile station and an identifier of the DLR to a home DLR ("home DLR") for registering location information of the mobile station;

the home DLR for storing the terminal ID of the mobile terminal and the identifier of the DLR;

a push server for, upon request for transmission of push data to the mobile terminal, requesting the home DLR for the identifier of the DLR which has allocated the temporary ID to the mobile terminal, receiving push data to be transmitted to a mobile station, temporarily storing the received push data and transmitting a paging request message for the mobile terminal to the DLR by using the IP address corresponding to the terminal ID, and transmitting the push data to the mobile terminal using an IP address of the mobile terminal, the IP address of the mobile terminal allocated in response to the paging request message; and a subscriber information table for storing the terminal ID of the mobile terminal with respect to a predetermined subscriber ID allocated to the subscriber, the subscriber ID being received together with the push data in the push server, the subscriber ID being utilized at the push server to determine the terminal ID for transmitting the paging request message.

12. The system of claim 11, wherein the mobile terminal establishes a point-to-point (PPP) session with a packet data service node (PDSN), upon receipt of the paging request message.

13. The system of claim 12, wherein the push server searches for the IP address of the mobile terminal for which the PPP session has been established and transmitting the push data to the IP address.

14. The system of claim 11, wherein the terminal ID is a domain host name of the mobile terminal.

15. The system of 12, wherein the mobile terminal is provided with a predetermined daemon for receiving the paging request message and, after the PPP session setup, receiving the push data.

16. A server apparatus for transmitting push data received from a correspondent node (CN) to a mobile terminal of a mobile subscriber in a mobile communication system having at least one data location register ("DLR") for allocating a predetermined temporary identifier (ID) to the mobile terminal when a communication is connected to the mobile terminal and transmitting a message including the terminal ID of the mobile station and an identifier of the DLR to a home DLR for registering location information of the mobile station, the home DLR ("home DLR") for storing a predetermined terminal ID of the mobile terminal and the identifier of the DLR, a packet data service node (PDSN) for establishing a point-to-point (PPP) session with the mobile terminal, and a domain name server (DNS), the server apparatus comprising:

a plurality of communication interfaces for interfacing the server apparatus with the DLR, the home DLR, the PDSN, the DNS, and CN;

a subscriber information table for storing the terminal ID of the mobile terminal with respect to a predetermined subscriber ID allocated to a subscriber, the subscriber ID being received together with the push data in the server apparatus;

a memory for buffering the push data;

a controller for temporarily storing the push data received from the CN, checking the terminal ID corresponding to the subscriber ID, and transmitting the push data to an internet protocol (IP) address corresponding to the terminal ID, wherein the IP address is an IP address of the mobile terminal; and wherein the server apparatus transmits a paging request to the DLR if it is determined that the mobile terminal does not have an IP address, said paging request causing an IP address to be allocated to the mobile terminal.

17. The server apparatus of claim 16, wherein the controller requests the DNS for the IP address corresponding to the terminal ID.

18. The server apparatus of claim 16, wherein if the IP address does not exist for the mobile terminal, the controller requests the home DLR for the DLR which has allocated the temporary ID to the mobile terminal.

19. The server apparatus of claim 18, wherein the controller transmits to the mobile terminal a predetermined paging request message associated to reception of the push data via the DLR, and the mobile terminal establishes the PPP session with the PDSN in response to the paging request message.

20. The server apparatus of claim 16, wherein the subscriber ID is an e-mail address of the subscriber.

21. The server apparatus of claim 16, wherein the terminal ID is a domain host name of the mobile terminal.

\* \* \* \* \*